(12) United States Patent
Arndt et al.

(10) Patent No.: US 10,458,852 B2
(45) Date of Patent: Oct. 29, 2019

(54) SYSTEM AND METHOD FOR DETECTING TEMPERATURE OF RAILROAD TRAIN WHEEL AND BEARING

(71) Applicant: Progress Rail Services Corporation, Albertville, AL (US)

(72) Inventors: Donald J. Arndt, Napoleon, MO (US); Roland Frank O'Connell, Lone Jack, MO (US); Mark Joseph Bartonek, Independence, MO (US)

(73) Assignee: Progress Rail Services Corporation, Albertville, AL (US)

( * ) Notice: Subject to any disclaimer, the term of this patent is extended or adjusted under 35 U.S.C. 154(b) by 467 days.

(21) Appl. No.: 15/083,859

(22) Filed: Mar. 29, 2016

(65) Prior Publication Data

US 2017/0284868 A1 Oct. 5, 2017

(51) Int. Cl.
*G01J 5/10* (2006.01)
*G01J 5/02* (2006.01)
*G01J 5/00* (2006.01)
*G01M 17/08* (2006.01)

(52) U.S. Cl.
CPC ............... *G01J 5/10* (2013.01); *G01J 5/0022* (2013.01); *G01J 5/025* (2013.01); *G01J 5/026* (2013.01); *G01J 2005/0033* (2013.01); *G01J 2005/0081* (2013.01); *G01J 2005/0085* (2013.01); *G01M 17/08* (2013.01)

(58) Field of Classification Search
CPC ............ G01J 5/10; G01J 5/025; G01K 1/024; G01M 17/08; B65H 2701/31; B65H 54/26; B65H 63/062; B65H 2557/65; D01H 13/32
See application file for complete search history.

(56) References Cited

U.S. PATENT DOCUMENTS

| 5,448,072 | A | | 9/1995 | Gallagher | |
|---|---|---|---|---|---|
| 5,677,533 | A | * | 10/1997 | Yaktine | B61K 9/04 246/169 A |
| 5,785,283 | A | * | 7/1998 | Ehrenberger | B61L 23/042 246/121 |
| 6,823,242 | B1 | * | 11/2004 | Ralph | B60T 17/228 340/682 |
| 6,872,945 | B2 | | 3/2005 | Bartonek | |

(Continued)

FOREIGN PATENT DOCUMENTS

| CA | 703819 | 2/1965 |
|---|---|---|
| CA | 1126378 | 6/1982 |

(Continued)

*Primary Examiner* — Harry W Byrne
*Assistant Examiner* — Sultana Begum
(74) *Attorney, Agent, or Firm* — Miller, Matthias & Hull

(57) ABSTRACT

A system for detecting a temperature of a railroad train wheel or bearing includes a thermal line scanner and a processor. The thermal line scanner is positioned to capture a plurality of thermal line scans of the wheel or bearing. The processor is configured to analyze each of the plurality of thermal line scans, identify a selected line of the plurality of thermal line scans, and calculate the temperature of the wheel or the bearing based on the selected line. Thus, the system and method disclosed herein reduce the acquired thermal data first to a single line for one or both of the wheel temperature and bearing temperature and then to single values.

14 Claims, 4 Drawing Sheets

(56) References Cited

U.S. PATENT DOCUMENTS

| | | | |
|---|---|---|---|
| 8,927,936 B2 | 1/2015 | Arndt et al. | |
| 9,151,681 B2 | 10/2015 | Arndt et al. | |
| 9,752,993 B1 * | 9/2017 | Thompson | G01M 17/10 |
| 2006/0131464 A1 * | 6/2006 | Hesser | B61K 9/06 |
| | | | 246/169 D |
| 2012/0022822 A1 * | 1/2012 | Rousselle | G06F 17/5009 |
| | | | 702/130 |
| 2014/0321501 A1 | 10/2014 | Bartonek et al. | |
| 2015/0069919 A1 * | 3/2015 | Radermacher | G11C 7/04 |
| | | | 315/152 |
| 2016/0314573 A1 * | 10/2016 | Salisbury | G01J 5/10 |
| 2016/0325767 A1 * | 11/2016 | LeFebvre | B61L 15/0027 |
| 2017/0106885 A1 * | 4/2017 | Singh | B61L 23/044 |

FOREIGN PATENT DOCUMENTS

| | | | | |
|---|---|---|---|---|
| CN | 202854531 U | * | 4/2013 | G05B 19/04 |
| GB | 1349224 | | 4/1974 | |

* cited by examiner

SYSTEM AND METHOD FOR DETECTING TEMPERATURE OF RAILROAD TRAIN WHEEL AND BEARING

TECHNICAL FIELD

The present disclosure relates to systems for detecting the temperature of a railroad train bearing and/or wheel.

BACKGROUND

Current temperature detection systems for railroad train components, also referred to as hot box and hot wheel detection systems, traditionally utilize a very limited view of the bearing and/or wheel to determine the temperature of these components. Generally, these detection systems are located in close proximity to the railroad track and, thus, passing railroad trains. As a result of environmental factors, including railroad track conditions and train movement, the locations of the temperature detection systems, and the limited areas of the bearing and/or wheel that are analyzed, may vary from one detection system to the next and/or one railroad train to the next.

In addition, the bearing typically has two bearing races. According to conventional temperature detection systems, the limited view of the bearing and/or wheel that is used to calculate the temperature of these components is only capable of evaluating one of the two bearing races. Thus, one bearing race is ignored. If it should fail, it might take a considerable amount of time before the heat propagates across the bearing such that it can be detected by the temperature detection system. As such, there is increased risk of burn offs and derailments in these circumstances.

Commonly owned US Patent Application Publication No. 2014/0321501 to Bartonek et al. is directed to a system and method for identifying a hot bearing. The system and method disclosed include one or more IR sensing elements positioned to receive IR radiation emitted from a target area of the bearing. A processor extracts IR data from the IR radiation signals, and creates a characteristic thermal profile exhibiting identifiable boundaries of an area of interest on the bearing. Temperatures within the area of interest are compared to a threshold, and an alarm signal is produced if the bearing temperatures within the area of interest exceed the threshold.

As should be appreciated, there is a continuing need to provide improved temperature detection systems and, thus, improved safety for railroad trains.

SUMMARY OF THE INVENTION

In one aspect of the present disclosure, a system for detecting a temperature of a railroad train wheel or bearing includes a thermal line scanner and a processor. The thermal line scanner is positioned to capture a plurality of thermal line scans of the wheel or bearing. The processor is configured to analyze each of the plurality of thermal line scans, identify a selected line of the plurality of thermal line scans, and calculate the temperature of the wheel or the bearing based on the selected line.

In another aspect, a method for detecting a temperature of a railroad train wheel or bearing uses a temperature detection system. The temperature detection system includes a thermal line scanner and a processor. The method includes steps of capturing a plurality of thermal line scans of the wheel or bearing using the thermal line scanner, and the following steps performed by the processor: analyzing each of the plurality of thermal line scans, identifying a selected line of the plurality of thermal line scans, and calculating the temperature of the wheel or the bearing based on the selected line.

DETAILED DESCRIPTION

Figure 1:
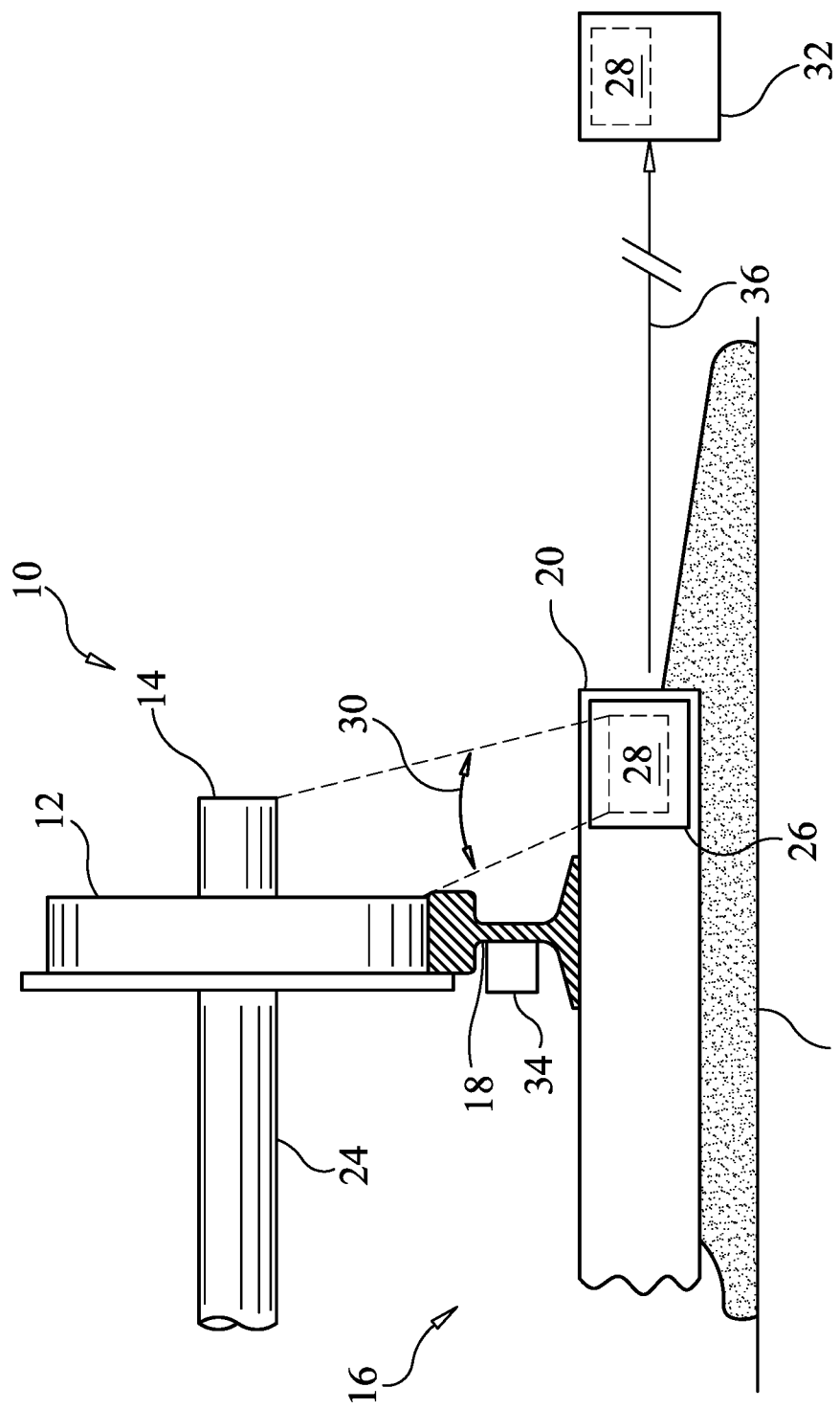
FIG. 1 is an illustration of a system for detecting a temperature of a railroad train wheel and/or bearing, according to one embodiment of the present disclosure.

Referring to FIG. 1, a temperature detection system 10, according to the present disclosure, is shown. The temperature detection system 10, as described herein, is capable of detecting a temperature, or heat, of a railroad wheel 12 and/or bearing 14. Such systems 10 are commonly referred to as "hot wheel or hot bearing detection systems" or "hot box and hot wheel detectors" by those skilled in the art. The system 10 is also referred to herein as a system for detecting a temperature of a railroad train wheel or bearing. The present disclosure is directed to such a system and methods for calculating the respective temperatures of these components. Although the present disclosure will recite specific embodiments, it should be appreciated that the concepts disclosed herein may have broader applicability.

A railroad vehicle, such as a railroad train including train cars, (not shown) moves along a railroad track 16, which generally includes a railroad rail 18 and a crosstie 20, which is supported on the ground 22. In particular, a railroad train car typically includes a plurality of axles, such as axle 24, which are connected to wheels 12 by bearings 14. As shown, wheels 12 move across rails 18 during normal train operation. Although only a first side of portions of the railroad track 16, train wheels 12 and bearings 14, and temperature detection system 10 are shown, it should be appreciated that the other side may represent a mirror image of the first side.

The temperature detection system 10 generally includes a thermal line scanner 26 and a processor 28, both configured as described herein to determine temperatures of one or both of the wheel 12 and the bearing 14. The thermal line scanner 26, including a thermal scan head, is positioned to capture a plurality of thermal line scans (shown in FIG. 2) of at least portions of one or both of the wheel 12 and the bearing 14. According to an exemplary embodiment, the thermal line scanner 26 may be positioned to capture thermal line scans of both the wheel 12 and the bearing 14. That is, a detection zone 30 may include both the wheel 12 and the bearing 14 and, as such, may look at 45 degrees and sit parallel to the rail 18. As will be discussed below, the temperature detection system 10 may include another thermal line scanner 26 positioned to capture similar thermal line scans of a wheel and bearing positioned on an opposite side of the axle 24. According to one example, the thermal line scanner 26 may clamp to the foot of rail 18 or sits on the crosstie 20, with the scan head facing parallel to the rail 18.

The processor 28, which may be positioned within the thermal line scanner 26 or at a remote location, such as, for example, within a wayside detector 32, is generally configured to calculate the temperature, or heat, of one or both of the wheel 12 and the bearing 14 based on at least one of the thermal line scans, compare one or both of the temperatures to a respective threshold temperature and, if the temperature exceeds the threshold, generate an appropriate alarm. Although only one processor 28 is shown and discussed, it should be appreciated that the tasks described herein may be performed by multiple processors. As such, the thermal line scanner 26 and/or the wayside detector 32 may include one or more processors.

As will be discussed later in greater detail, a sensor, such as a wheel sensor 34, may indicate to the processor 28 when the thermal line scanner 26 should begin capturing thermal line scans. For example, according to one example, the wheel sensor 34 may attach to the rail 18 so a flange of the wheel 12 rolls over it. The processor 28 may be configured and/or programmed to process a plurality of thermal line scans as described in detail below, and arrive at a bearing temperature and/or a wheel temperature, which may be maximum values for each of these components. Such information, or data, may be processed, analyzed, and/or stored at the thermal line scanner 26 and/or all or portions of the data may be transmitted by a wired or wireless communication line 36 to another location, such as, for example, the wayside detector 32, where it may be processed, analyzed, and/or stored.

Figure 2:
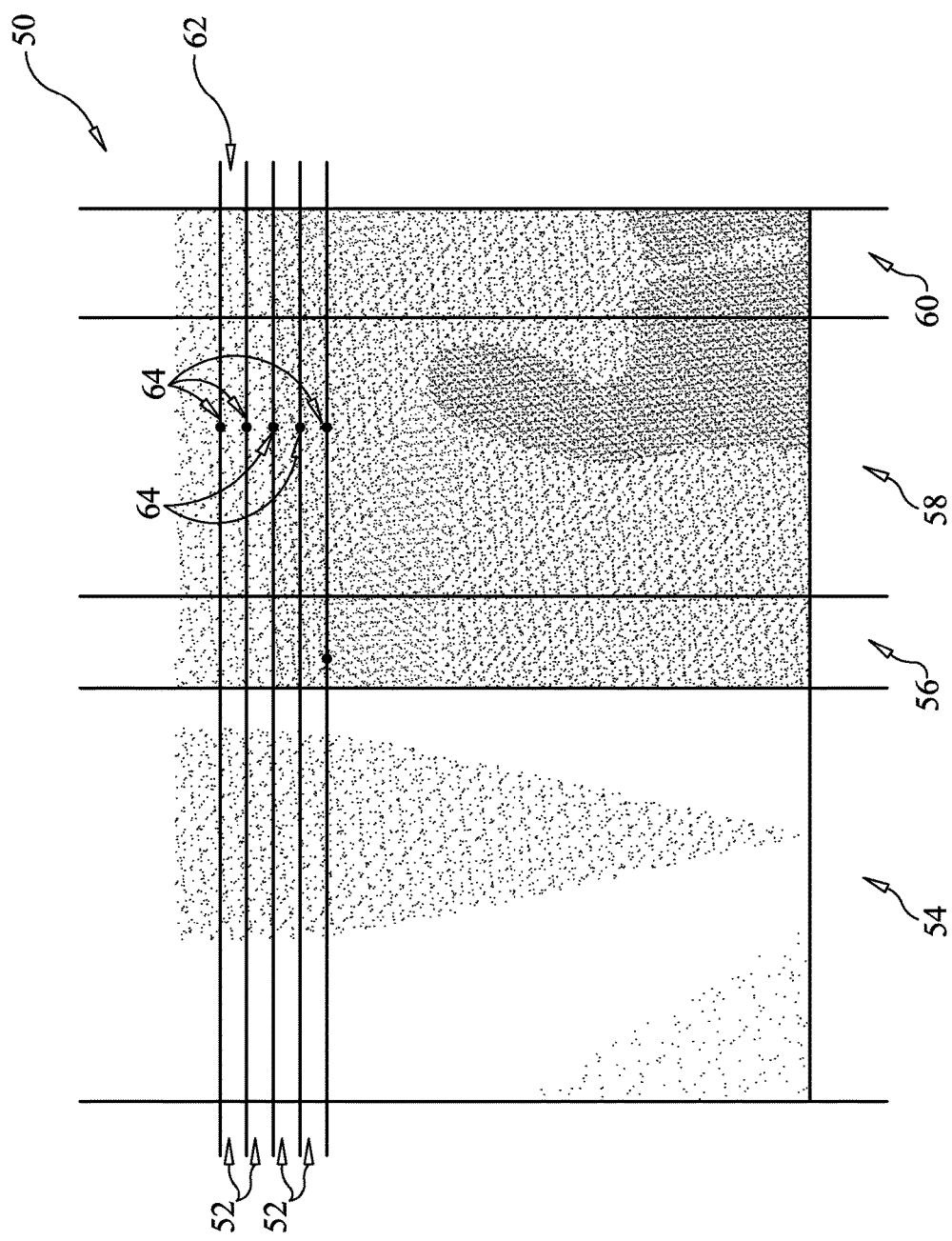
FIG. 2 is an exemplary set of thermal line scans captured using a thermal line scanner of the system of FIG. 1, shown divided into zones, according to one aspect of the present disclosure.

Turning now to FIG. 2, an exemplary set, or plurality, of thermal line scans 50, captured using the thermal line scanner 26 and including both the wheel 12 and the bearing 14, are shown. The set of thermal line scans 50, which may be greatly distorted due to train movement, may include a plurality of lines, for example, line scans 52, of pixels or data points. According to some embodiments, there may be about 240 line scans and each thermal line scan 52 may include about 320 points of thermal data. Of course alternative line scan sizes may additionally or alternatively be captured and may be processed accordingly by the processor 28. The processor 28 may be configured to identify zones of each of the thermal line scans 52 of data points. For example, as shown in FIG. 2, ZONE "1" may represent a wheel zone 54, ZONE "2" may represent an isolation zone 56, ZONE "3" may represent a bearing zone 58, and ZONE "4" may represent an unused zone 60. Zone sizes may vary, depending on the particular train and axle.

According to an exemplary embodiment, and as will be described in greater detail in the methods described below, the processor 28 may be programmed and/or configured to analyze each of the thermal line scan 52, line by line, to identify a selected line 62 of the thermal line scans 52. A temperature, or maximum temperature, of one or both of the wheel 12 and the bearing 14 may be determined or calculated, by the processor 28, based on the selected line 62. According to some embodiments, temperatures of both the wheel 12 and the bearing 14 may be determined using the same selected line 62. Alternatively, a first selected line may be used to determine the wheel temperature, while a second selected line may be used to determine the bearing temperature.

In particular, and according to an exemplary embodiment, the processor 28 may perform an algorithm on data points within the bearing zone 58 for each thermal line scan 52 to identify the selected line 62. The algorithm, as described below, may include identifying a midpoint 64 of the bearing zone 58 and averaging maximum bearing values on either side of the midpoint 64. The data points within the selected line 62 may be used to calculate, or arrive at, both the bearing temperature and the wheel temperature (also referred to as maximum or max values thereof), as mentioned above. According to alternative embodiments, the selected line 62 may be used to calculate only the bearing temperature, with an additional or alternative selected line being used to calculate the wheel temperature. Similar or different algorithms may be used to arrive at the wheel and bearing temperatures.

Figure 3:
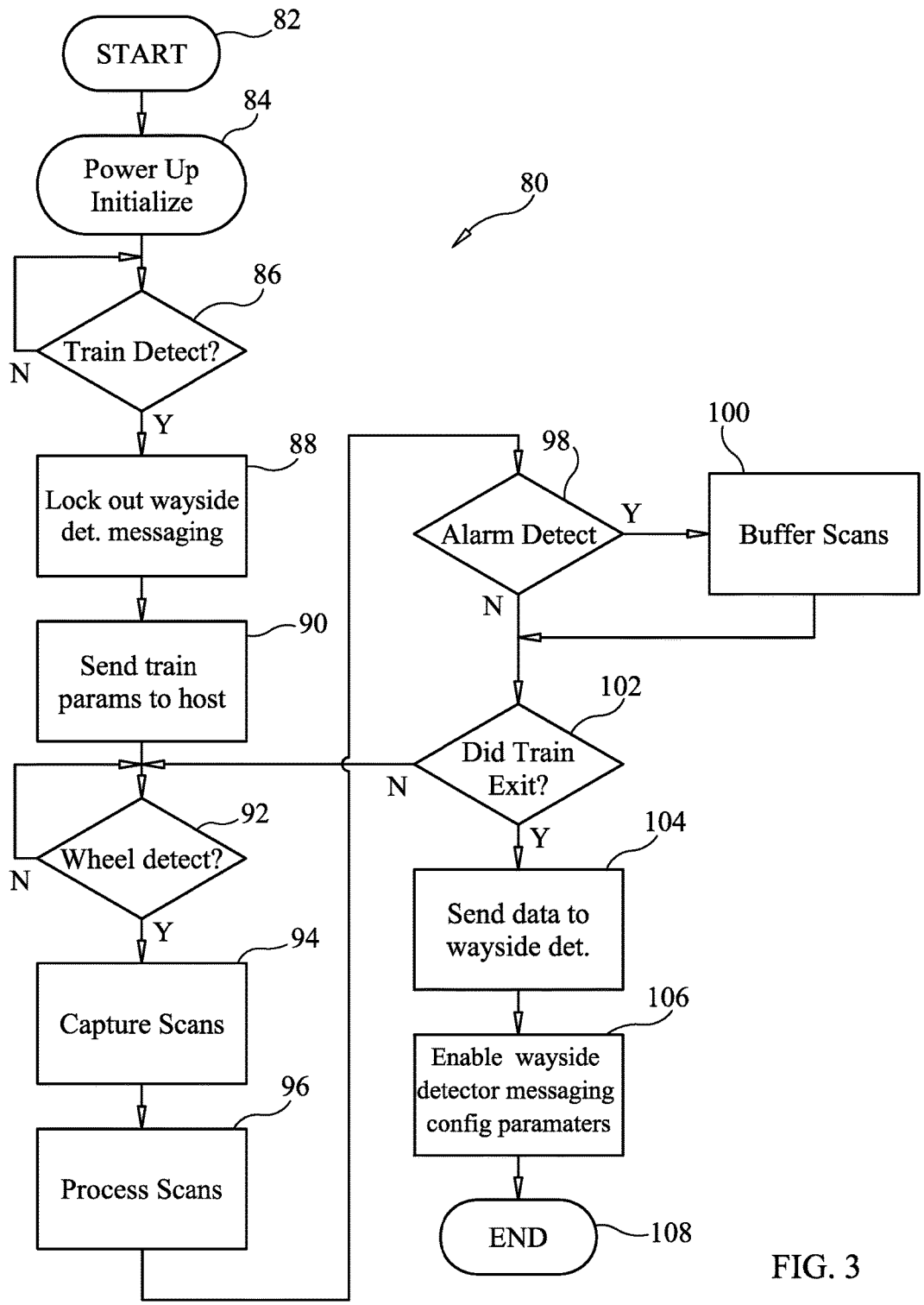
FIG. 3 is a flow diagram illustrating an exemplary method of processing a train using the temperature detection system of FIG. 1, according to another aspect of the present disclosure.
Figure 4:
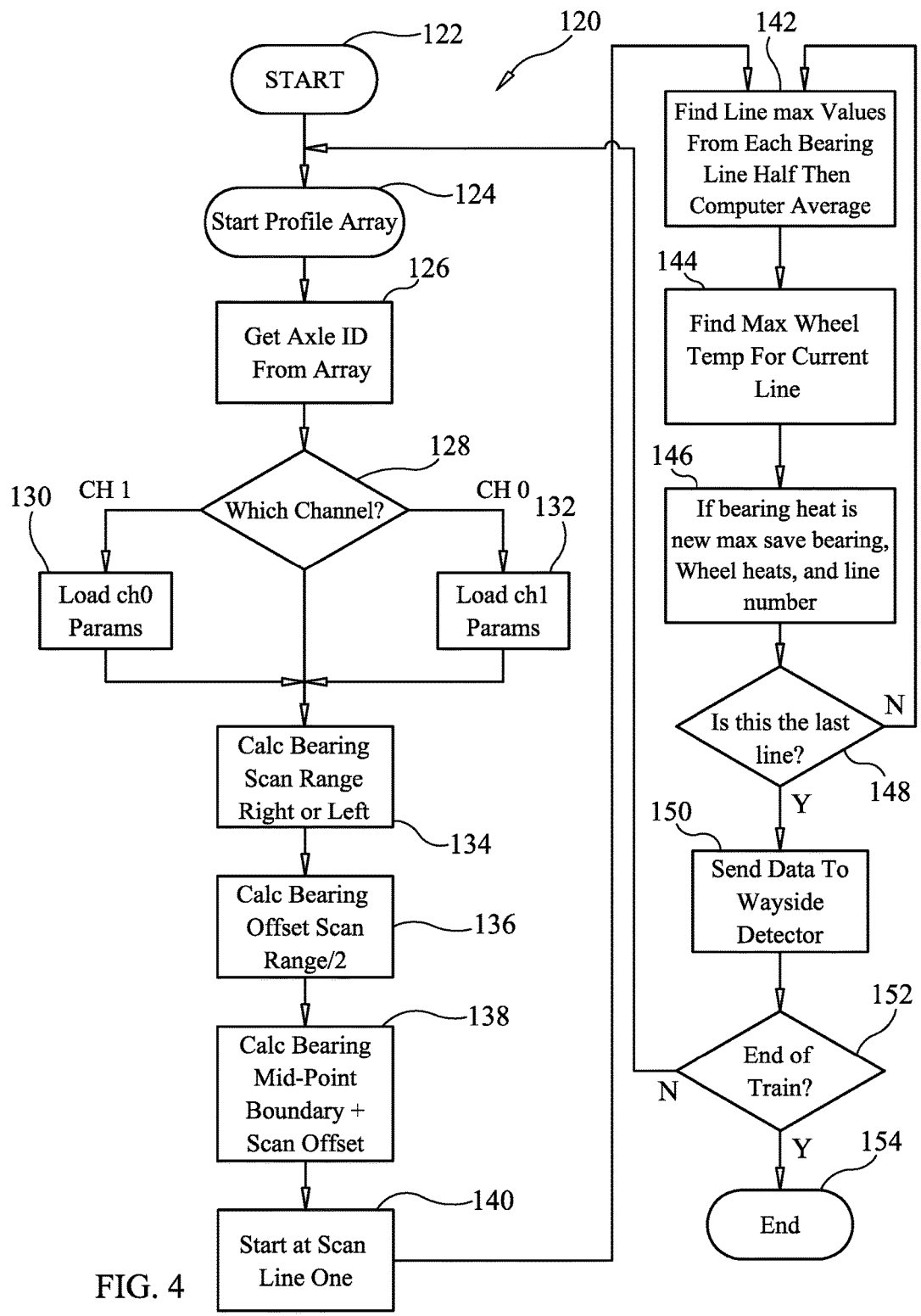
FIG. 4 is a flow diagram illustrating an exemplary method of processing axles, and thermal line scans thereof, of the train using the temperature detection system of FIG. 1, according to yet another aspect of the present disclosure.

An exemplary temperature calculation method using the temperature detection system 10, according to the present disclosure, will be discussed with reference to FIGS. 3 and 4, and with continued reference to FIGS. 1 and 2. Turning first to FIG. 3, an exemplary method for processing a railroad vehicle, or train, car by car is illustrated using a flow diagram 80. The method may be implemented in whole or in part by the processor 28, in combination with the thermal line scanner 26, and may run continuously, intermittently, or at predetermined intervals.

The method begins at a START, at Step 84. The temperature calculation system 10 may be powered up and initialized at a first step, Step 86, and may then wait, at Step 88, for detection of a railway vehicle, or train. It should be appreciated by those skilled in the art that currently available technology, positioned alongside the railroad track 16 and/or at the wayside detector 32, may be configured to detect the approach or presence of a train. Once a train is detected, wayside detection messaging may be locked out or disabled, at Step 88, such that train processing can occur without interruption.

At Step 90, train parameters for the particular train that is detected are sent to the processor 28 and/or the wayside detector 32. At a next step, Step 92, the system 10 waits for a wheel detection signal from one or more sensors, such as the wheel sensor 34 of FIG. 1, to be received. Although the wheel sensor 34 is shown, alternative hardware and/or software methods may be used to detect the approach and/or presence of each axle 24 (including wheel 12 and bearing 14). The processor 28 and/or thermal line scanner 26 may be programmed and/or configured to capture a plurality of thermal line scans, such as set of thermal line scans 50, at an appropriate time relative to wheel detection (Step 94).

The set of thermal line scans 50 may then be processed, at Step 96, line by line. Details regarding line scan processing will be discussed in greater detail with reference to the method and flow diagram of FIG. 4. Returning to FIG. 3, line scan processing will result in calculation or identification of a temperature of the bearing 14 and/or a temperature of the wheel 12 (and/or maximum temperatures thereof). At Step 98 the method determines whether an alarm condition exists. According to the exemplary embodiment, an alarm may be generated if the bearing temperature is above a predetermined threshold and/or if the wheel temperature is above a predetermined threshold. As should be appreciated by those skilled in the art, when such a condition occurs, it is important to identify the appropriate authority without delay.

At Step 100, the set of thermal line scans 50 may be buffered within memory of the processor 28 and/or wayside detector 26. According to some embodiments, it may be desirable to store only those of the set of thermal line scans 50 in which temperatures of components exceed threshold values. In other embodiments, it may be desirable to store the entire set of thermal line scans 50. Such data may be stored locally and/or remotely. Preferences, however, may be superseded by capabilities and capacity of the processor 28 and/or thermal line scanner 26.

Thermal line scans may occur for each axle 24, including two per axle 24 (i.e., a set of thermal line scans 50 for each opposing side of the axle 24), until it is determined that the train has exited. The wheel sensor 34 may or may not be used in determining when a train exits. For example, the wheel sensor 34 may be useful at not only determining when a wheel 12 is present, but also determining when a wheel 12 is NOT present. Additionally or alternatively, the wayside detector 32 may be programmed and/or configured to detect and notify regarding the presence and/or exiting of a train.

After it is determined that the train being processed has exited, at Step 102, the method proceeds to Step 104. At Step 104, the processor 28 and/or thermal line scanner 26 transmits data, including buffered data, to the wayside detector 32, or another location, via communication line 36. This data may be useful in monitoring, tracking, and/or averaging temperatures for train components across time and distance. For example, this data may be used to evaluate train bearing trending between detectors. After the data is transferred, wayside detector messaging may be enabled or re-enabled, at Step 106. The method then proceeds to an END, at Step 108. According to some embodiments, the method may immediately begin again, awaiting detection of a next train, at Step 86.

As mentioned above, the axle processing, or thermal line scan processing, will be discussed in greater detail with reference to FIG. 4. Turning now to FIG. 4, the exemplary method is illustrated using a flow diagram 120. The method may be implemented in whole or in part by the processor 28, in combination with the thermal scanner 26, and may run continuously, intermittently, or at predetermined intervals.

The method begins at a START, at Step 122. The first part of the method includes various initialization steps. At Steps 124 and 126, respectively, profile information is received in an array format and an axle ID is retrieved from the array. At Step 128 it is determined which side of the train, and axle 24, is being scanned and evaluated. For example, if a set of thermal line scans 50 of one side of the axle 24 is being processed, channel 0 parameters may be loaded, at Step 130. If a set of thermal line scans 50 of the other side of the axle 24 is being processed, channel 1 parameters may be loaded, at Step 132.

The next several steps, Steps 134, 136, and 138, include steps for initializing and/or synchronizing the thermal line scanner 26 and its functionality relative to the particular train and axle parameters. At Step 140 a first line, or first thermal line scan, 66 (shown in FIG. 2) of the plurality of thermal line scans 52 is processed. In particular, according to the method, for each of the thermal line scans 52, an algorithm is performed on data points within the bearing zone 58 to arrive at a current bearing value, or max bearing temperature. This current bearing value may be determined by identifying a midpoint 64 within the bearing zone 58, determining a first max value of data points on a first side of the midpoint 64, determining a second max value of data points on a second side of the midpoint 64, adding the first max value and the second max value to arrive at a sum, and dividing the sum by two. See Step 142.

Although a specific algorithm is described, it should be appreciated that alternative algorithms may be used for selecting, determining, or calculating the bearing temperature. For example, an alternative algorithm may include averaging all values in the bearing zone 58. Another alternative algorithm may include dividing the bearing zone 58 into three sub-zones and averaging the outer two sub-zones of the three sub-zones. As stated, additional algorithms are contemplated for extracting the bearing temperature, or heat, from the line scan 52.

Turning now to Step 144, the max wheel temperature may also be calculated or determined using a similar or different algorithm than that used for calculating the current bearing value, or max bearing temperature. According to the exemplary embodiment, a saved bearing value (or max bearing temperature) corresponding to this current bearing value for the first thermal line scan 66 is stored. For each subsequent thermal line scan 52, the saved bearing value will be replaced by the current bearing value if the current bearing value is greater than the saved bearing value. In fact, if the current bearing value is greater than the saved bearing value, each of the current bearing value (max bearing temperature), the max wheel temperature, and the thermal line scan number, representative of a selected line 62, are all saved (Step 146). That is, the max wheel value, or wheel temperature, for the selected line 62, which is based on the max bearing value, may be selected and stored.

As illustrated at Step 148, the algorithm is performed on each thermal line scan 52 of the set of thermal line scans 50. After the last line scan 52 of the set of thermal line scans 50 is processed, data may be transmitted to the wayside detector 32, at Step 150. Line scans 52 of each axle 24, including both sides of the axle 24, may be taken and processed until the end of the train is detected, at Step 152. When the end of the train is detected, the method proceeds to an END, at Step 154.

According to the exemplary embodiment, the thermal line scanner 26 may be configured to see true, or absolute, temperature. Conventional temperature detection systems are typically configured to calculate and process relative temperature, such as a temperature relative to ambient temperature. As such, and particularly for retrofit systems, the processor 28, thermal line scanner 26 and/or wayside detector 32 may be configured to convert temperature values calculated by the system 10 and methods described herein to temperatures above ambient temperature using known conversion techniques. Integrating all or portions of the system 10 described herein with conventional systems may benefit by performing this conversion. The algorithms disclosed herein may reduce the amount of data gathered to amounts of data needed for integration with conventional temperature detection systems.

According to some embodiments, the processor 28, thermal line scanner 26 and/or wayside detector 32 may be configured to provide sun filtering of the set of thermal line scans 50, particularly in the bearing zone 58. According to one example, if pixel saturation is observed in a predetermined number of adjacent pixels and/or if a sudden drop from saturation to normal readings is observed, the thermal line scan 52 is not used or selected.

INDUSTRIAL APPLICABILITY

The present disclosure is applicable to systems and methods for detecting railroad component temperatures, More particularly, the present disclosure is applicable to a system and methods for detecting and monitoring bearing and/or wheel temperatures of passing trains. All or portions of the system and methods described herein may be integrated with or replace existing wheel and/or bearing temperature detection systems and methods.

Referring to FIGS. 1-4 presented above, the present disclosure is directed to a temperature detection system 10 generally including a thermal line scanner 26 and one or more processors 28. The thermal line scanner 26 is positioned and configured to capture a set of thermal line scans 50 of a wheel 12 and/or bearing 14 of a passing train. As shown in FIG. 2, due to the speed of the passing train, the plurality of thermal line scans 50 may be greatly distorted and/or may contain objects interfering with a clear view of the wheel 12 and/or bearing 14.

The system 10 and methods described herein are used to process the plurality of thermal line scans 50 line by line and extract maximum temperature values for the bearing 14 and/or wheel 12 based on a single selected line. In particular, and as described above, the processor 28, alone or in combination with other processors, is programmed and/or configured to analyze each of a set of thermal line scans 50, identify a selected line 62 of the thermal line scans 52, and calculate the temperature of the wheel 12 and/or the bearing 14 based on the selected line 62. The selected line 62, as chosen based on the methods and algorithms described herein, is used to identify temperature readings that are more accurate than those of conventional systems.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A system for detecting a temperature of a railroad train wheel and bearing, comprising:
  a thermal line scanner capturing a plurality of thermal line scans of a detection zone which includes capturing the wheel and bearing as the wheel and bearing rotate;
  a processor of the thermal line scanner analyzing each of the plurality of thermal line scans: identifying at least a bearing zone and a wheel zone in the captured plurality of thermal line scans; selecting a single line of the captured plurality of thermal line scans which includes both the hearing zone and the wheel zone; and determining the temperature of the wheel based on the wheel zone of the selected line and the temperature of the bearing based on the bearing zone of the selected line;
  a wayside detector including a second processor, the processor of the thermal line scanner transmitting data, including buffered data, to the wayside detector, wherein the transmitted data is processed to evaluate train bearing trends, and a messaging from the wayside detector about the train bearing trends is re-enabled; and
  generating an alarm if the temperature of the wheel or the temperature of the bearing is above a predetermined threshold.

2. The system of claim 1, wherein the thermal line scanner sits on a crosstie with a scan head facing parallel to a rail, and the thermal line scans occur as two for each axle and as a set for each opposing side of each axle.

3. The system of claim 1, wherein the processor identifies the selected single line based on a thermal line scan corresponding to a maximum bearing value.

4. The system of claim 3, wherein the processor is further configured to determine the maximum bearing value based on a current bearing value of each thermal line scan, wherein the current bearing value is determined by averaging a bearing value on either side of an identified midpoint of the bearing zone.

5. The system of claim 1, wherein the processor is further configured to compare the bearing temperature to a threshold bearing temperature and generate an alarm if the bearing temperature is greater than the threshold bearing temperature.

6. The system of claim 3, wherein the processor is further configured to determine the temperature of the wheel based on a current wheel value of the identified selected single line, wherein the current wheel value is determined by averaging a wheel value on either side of an identified midpoint of the wheel zone.

7. The system of claim 1, wherein the temperature of the wheel and the temperature of the bearing are converted from an absolute temperature to a relative temperature relative to an ambient temperature.

8. A method for detecting a temperature of a railroad train wheel and bearing using a temperature detection system, the temperature detection system including a thermal line scanner and a processor, the method comprising steps of:
  capturing a plurality of thermal line scans of a detection zone which includes capturing the wheel and bearing as the wheel and bearing rotate using the thermal line scanner, which sits on a crosstie with a scan head facing parallel to a rail, and the thermal line scans occur as two for each axle and as a set for each opposing side of each axle;
  analyzing each of the plurality of thermal line scans using the processor to:
    identify at least a bearing zone and a wheel zone in the captured plurality of thermal line scans;
    select a single line of the captured plurality of thermal line scans which includes both the bearing zone and the wheel zone;
    determine the temperature of the wheel based on the wheel zone of the selected line and the temperature of the bearing based on the bearing zone of the selected line;
    transmit data, including buffered data, to a wayside detector, which includes another processor, wherein the transmitted data is processed to evaluate train bearing trends between detectors, and a messaging from the wayside detector about the train bearing trends is re-enabled;
  after a last line scan of the thermal line scans is processed, data is transmitted to the wayside detector; and
  generating an alarm if the temperature of the wheel or the bearing is above a predetermined threshold.

9. The method of claim 8, wherein the single line selecting includes identifying the thermal line scan corresponding to a maximum bearing value.

10. The method of claim 9, wherein the the maximum bearing value is based on a current bearing value of each thermal line scan, wherein the current bearing value is determined by averaging a bearing value on either side of an identified midpoint of the bearing zone.

11. The method of claim 9, wherein the temperature of the wheel is based on a current wheel value of the selected single line, wherein the current wheel value is determined by averaging a wheel value on either side of an identified midpoint of the wheel zone.

12. The method of claim 9, wherein the temperature of the wheel and the temperature of the bearing are converted from an absolute temperature to a relative temperature relative to an ambient temperature.

13. The method of claim 9, further including: comparing the maximum bearing value to a threshold bearing temperature and generating an alarm if the maximum bearing value is greater than the threshold bearing temperature.

14. The method of claim 8, further including transmitting the bearing temperature of the selected single line to the wayside detector.

* * * * *